US011605861B2

(12) United States Patent
Rhee et al.

(10) Patent No.: US 11,605,861 B2
(45) Date of Patent: *Mar. 14, 2023

(54) BATTERY MODULE WITH FLAME OR GAS DISCHARGE PATH

(71) Applicant: SK Innovation Co., Ltd., Seoul (KR)

(72) Inventors: Seo Roh Rhee, Daejeon (KR); Hae Ryong Jeon, Daejeon (KR); Gyu Jin Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 154 days.

This patent is subject to a terminal disclaimer.

(21) Appl. No.: 17/225,850

(22) Filed: Apr. 8, 2021

(65) Prior Publication Data

US 2021/0320364 A1    Oct. 14, 2021

(30) Foreign Application Priority Data

Apr. 8, 2020   (KR) ........................ 10-2020-0042516

(51) Int. Cl.
*H01M 50/30*   (2021.01)
*H01M 50/35*   (2021.01)
*H01M 50/383*  (2021.01)
*H01M 50/517*  (2021.01)

(52) U.S. Cl.
CPC .......... *H01M 50/35* (2021.01); *H01M 50/30* (2021.01); *H01M 50/383* (2021.01); *H01M 50/517* (2021.01)

(58) Field of Classification Search
CPC .. H01M 50/30; H01M 2200/00; H01M 50/35; H01M 50/358; H01M 50/367
See application file for complete search history.

(56) References Cited

U.S. PATENT DOCUMENTS

| 3,647,542 A * | 3/1972 | Berger ................ H01M 50/463 429/129 |
| 6,416,896 B1 * | 7/2002 | Tamaru ............... H01M 4/8605 429/534 |
| 2006/0166081 A1 * | 7/2006 | Sauter ................... H01M 50/35 429/88 |
| 2008/0274396 A1 * | 11/2008 | Routson ............... H01M 50/35 429/82 |
| 2015/0221914 A1 * | 8/2015 | Page ................... H01M 50/202 429/82 |
| 2022/0311088 A1 * | 9/2022 | Ryu .................... H01M 50/262 |

FOREIGN PATENT DOCUMENTS

| JP | H09-279716 A | 10/1997 | |
| KR | 1020181870508 | * 6/2016 | ............. H01M 2/10 |
| KR | 10-2017-0014309 A | 2/2017 | |

OTHER PUBLICATIONS

Machine Translation of KR 10-2018-1870508 A (Year: 2018).*

* cited by examiner

*Primary Examiner* — Imran Akram
(74) *Attorney, Agent, or Firm* — IP & T Group LLP

(57) ABSTRACT

A battery module is provided comprising a plurality of battery cells and a housing having an internal space in which the plurality of battery cells are accommodated. The housing is at least partially formed of a plate member which is connected with the internal space. The plate member forms a flame or gas path which in an event of a battery cell malfunction generating a flame or gas is configured to discharge the generated flame or gas externally of the housing.

16 Claims, 9 Drawing Sheets

BATTERY MODULE WITH FLAME OR GAS DISCHARGE PATH

CROSS-REFERENCE TO RELATED APPLICATION(S)

This application claims benefit of priority to Korean Patent Application No. 10-2020-0042516 filed on Apr. 8, 2020 in the Korean Intellectual Property Office, the disclosure of which is incorporated herein by reference in its entirety.

BACKGROUND

1. Field

The present disclosure relates to a battery module.

2. Description of Related Art

As technological developments and demands for mobile devices, electric vehicles, and the like increase, demands for battery cells as an energy source are rapidly increasing. Such a battery cell is a battery that can be repeatedly charged and discharged because the mutual conversion between chemical energy and electrical energy thereof is reversible.

Such a battery cell includes an electrode assembly including a cathode, an anode, a separator, and an electrolyte, etc., a major component of the battery, and a cell body member as a laminated film case protecting the electrode assembly.

In addition, a plurality of battery cells may be mounted and installed as a battery module in an electric vehicle, an energy storage system (ESS), or the like.

However, the electrode assembly generates heat during a charging or discharging process, and the generation of the heat causes an increase in temperature, resulting in deterioration in performance of the battery cell.

In addition, an explosion of any one battery cell due to internal factors of the battery module such as the increase in temperature of the battery cell or an explosion of any one battery cell due to an external shock may lead to successive explosions of other battery cells in the battery module.

Furthermore, thermal propagation, flame or high-temperature and high-pressure gas, and the like caused by the explosion of any one battery module may affect another adjacent battery module, leading to a much greater problem of successive explosions of battery modules.

In addition, such a battery module is generally installed under the bottom of an electric vehicle. In this case, if the flame is discharged through an upper portion of the battery module, there is a problem in which passengers including a driver in the electric vehicle may be exposed to greater risk.

Therefore, in order to solve the above-described problems or limitations, it has been required to research battery modules.

RELATED ART DOCUMENT (Patent Document 1) KR 10-2017-0014309 A (Feb. 8, 2017)

SUMMARY

The present invention is directed generally to a battery module providing an improved solution to a problem in which an explosion in any one of a plurality of battery modules may cause successive explosions to one or more adjacent battery modules.

The present invention provides a battery module improved with respect to a problem in which passengers including a driver in an electric vehicle are exposed to a risk that may be caused by a flame discharged from the battery module.

According to an embodiment of the present disclosure, a battery module may include a plurality of battery cells and a housing having an internal space in which the plurality of battery cells are accommodated. The housing may be at least partially formed of a plate member which is connected with the internal space. The plate member may form a flame or gas path which in an event of a battery cell malfunction generating a flame or gas is configured to discharge the generated flame or gas externally of the housing.

The plate member may include a core portion disposed between a first plate portion and a second plate portion. The core portion may be configured to reduce a rate of discharge of the flame or gas.

The plate member may be integrally formed with a bottom member or a sidewall member of the housing and may include an entrance portion in communication with the internal space and a discharge portion configured to discharge the flame or gas.

The plate member may include a first plate portion, and a second plate portion positioned opposite to and spaced apart from the first plate portion to form the flame or gas path. The plate member may also include a core portion disposed between the first plate portion and the second plate portion and configured to extend the flame or gas path, and a discharge portion formed sidewardly or downwardly of the housing in the first plate portion or the second plate portion to discharge a flame or gas entering between the first plate portion and the second plate portion externally.

The housing may include a bottom member on which the plurality of battery cells are seated, and front and rear members provided at edges of the bottom member and connected to electrode lead portions of plurality of the battery cells. The plate member may at least be provided for the front and rear members.

Each of the front and rear members may include a bolt member screw-coupled to a lower end portion of the plate member to couple the plate member to the bottom member.

The bolt member may have a bolt hole formed in a length direction to communicate with a space of the flame or gas path formed between the first plate portion and the second plate portion.

The housing may include a bottom member on which the plurality of battery cells are seated, and front and rear members provided at edges of the bottom member and connected to electrode lead portions of the plurality of the battery cells, and the plate member may at least be provided for the bottom member.

The bottom member may include a recess formed to receive a shark fin portion protruding downward from a sealing portion of each of the battery cells, and an entrance portion may be formed in the recess to allow communication between the internal space and the flame or gas path.

The housing may include a bottom member on which the plurality of battery cells are seated, front and rear members provided at edges of the bottom member and connected to electrode lead portions of the plurality of the battery cells, sidewall members provided at edges of the bottom member and neighboring the front and rear members, and a cover member provided on upper ends of the front and rear members and the sidewall members. The plate member may at least be provided for the sidewall members.

The core portion may be formed in a pattern in which a unit column portion is repeated in a form of a hollow polygonal column. The core portion may, thus, include a plurality of hollow polygonal columns neighboring each other.

The unit column portion may have communication portions formed in at least two column surfaces thereof.

The unit column portion may have a first communication portion formed adjacent to the first plate portion and a second communication portion formed adjacent to the second plate portion to form the flame or gas path (or gas path) in a zigzag form.

The second plate portion may have an entrance portion formed to allow the internal space in which the battery cells are accommodated to communicate with a space between the first plate portion and the second plate portion.

The plate member may include an opening/closing plate portion connected to the second plate portion and opening or closing the entrance portion.

The plate member may include an accommodation member accommodated in a space between the first plate portion and the second plate portion and formed of a material for performing at least one of an extinguishing function, a heat absorption function, and a fire resistance function.

In an embodiment, a battery module may comprise: a housing forming an internal space configured to accommodate a plurality of battery cells, the housing including a plate member, wherein the plate member includes an entrance portion in communication with the internal space, a discharge portion, and a flame or gas path connecting the entrance portion with the discharge portion. In an event of a battery cell malfunction generating a flame or gas in the internal space, a flame or gas path is configured to discharge the flame or gas externally of the housing at a reduced discharge rate.

The plate member may be integrally formed with at least one member of the housing and include a core portion disposed between a first plate portion and a second plate portion. The core portion may be configured to reduce a rate of discharge of the flame or gas.

The plate member may be integrally formed with a bottom member of the housing and configured to discharge the flame or gas downwardly of the battery module.

The bottom member of the battery module may include a recess formed to receive shark fin portions protruding downward from sealing portions of the plurality of the battery cells. The recess may include the entrance portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, various embodiments of the present disclosure will now be described in detail with reference to the accompanying drawings.

The present disclosure relates to a battery module with an improvement with respect to a problem in which an explosion of any one battery module causes a successive explosion to another adjacent battery module. That is, the present disclosure is provided to prevent thermal runaway of any one battery module from leading to thermal propagation to another battery module.

In another aspect, the present disclosure relates to a battery module capable of dissipating a flame generated by an explosion of any one battery module, and securing structural rigidity in shock and vibration environments while achieving weight reduction.

In another aspect, the present disclosure relates to a battery module with an improvement with respect to a problem in which passengers including a driver in an electric vehicle are exposed to a risk that may be caused by a flame discharged from the battery module. That is, the battery module is generally installed under the bottom of the electric vehicle. In this case, the flame is discharged through an upper portion of the battery module, and passengers including a driver in the electric vehicle are exposed to a risk. However, the battery module according to the present disclosure is capable of solving this problem.

Figure 1:
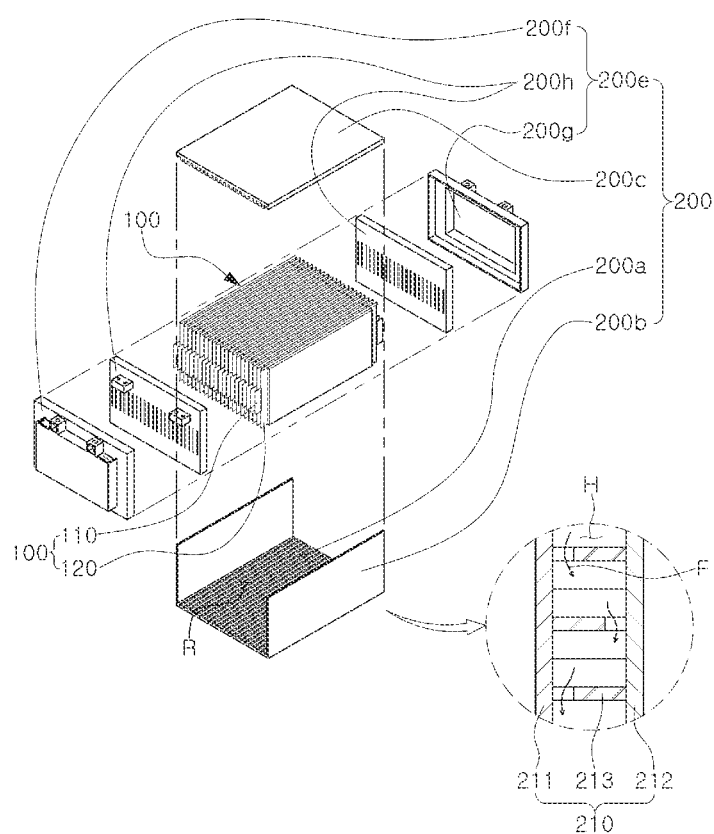
FIG. 1 is an exploded perspective view illustrating a battery module according to the present disclosure.
Figure 2:
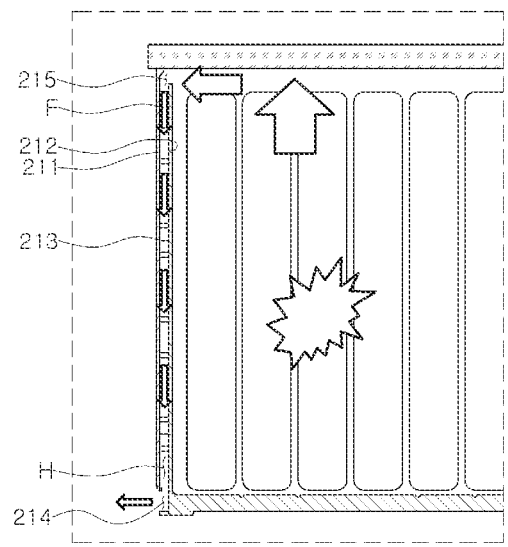
FIG. 2 is a side cross-sectional view illustrating a plate member provided for sidewall members in the battery module according to the present disclosure.

Specifically, referring to the drawings, FIG. 1 is an exploded perspective view illustrating a battery module according to the present disclosure, and FIG. 2 is a side cross-sectional view illustrating a plate member 210 provided for sidewall members 200b in the battery module according to the present disclosure.

Figure 3:
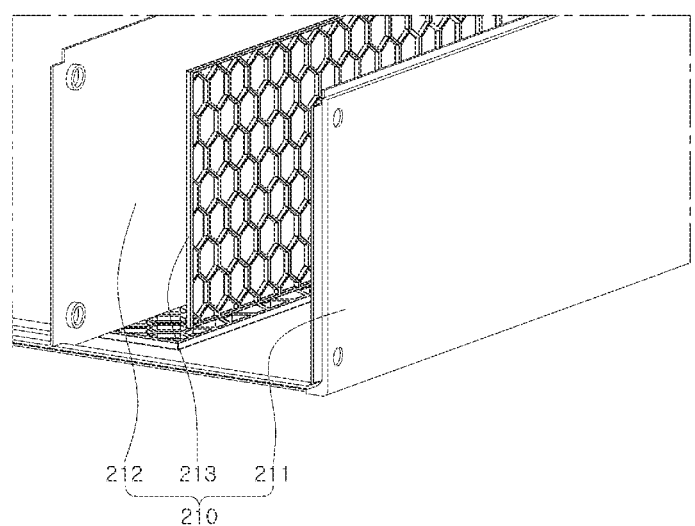
FIG. 3 is an exploded perspective view transparently illustrating a part of a first plate portion of a plate member provided for a bottom member and sidewall members of a housing in the battery module according to the present disclosure.
Figure 4:
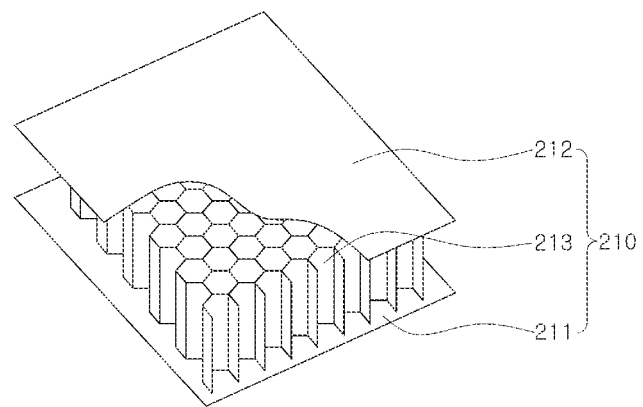
FIG. 4 is a perspective view illustrating the plate member in the battery module according to the present disclosure.

In addition, FIG. 3 is an exploded perspective view transparently illustrating a part of a first plate portion 211 of a plate member 210 provided for a bottom member 200a and sidewall members 200b of a housing 200 in the battery module according to the present disclosure, and FIG. 4 is a perspective view illustrating the plate member in the battery module according to the present disclosure.

Referring to FIGS. 2 through 4, a battery module according to an embodiment of the present disclosure may include: a plurality of battery cells 100; and a housing 200 having an internal space R in which the plurality of battery cells 100 are accommodated, and at least partially formed of a plate member 210. The plate member 210 may include: a first plate portion 211 disposed on one side thereof; a second plate portion 212 disposed on the other side thereof to be spaced apart from the first plate portion 211 by a predetermined interval; a core portion 213 disposed between the first plate portion 211 and the second plate portion 212 and extending a flame or gas path F; and a discharge portion 214 formed sidewardly or downwardly of the housing 200 in the first plate portion 211 or the second plate portion 212 to discharge a flame or gas entering between the first plate portion 211 and the second plate portion 212 externally.

In this manner, the battery module according to the present disclosure may be configured to dissipate a flame generated from the battery cell 100 disposed in the internal space R through the extended flame or gas path.

That is, in the battery module according to the present disclosure, since the flame is dissipated as passing through the extended flame or gas path before being discharged externally, it is possible to prevent a problem in which the flame propagates to another neighboring battery module, causing a successive explosion.

The dissipation of the flame results from the path extended to decrease a temperature of the flame and deplete oxygen so that flame retention conditions may be eliminated.

In addition, in the battery module according to the present disclosure, since gas is cooled before being discharged externally, it is possible to prevent a problem in which the high-temperature gas spreads to another neighboring battery module, causing a successive explosion.

That is, by extending the gas path, the temperature of the gas may be lowered while the gas moves through the gas path, thereby cooling the gas.

In addition, in the battery module according to the present disclosure, since the discharge portion 214, through which the flame or gas is discharged, is formed sidewardly or downwardly of the housing 200 such that the flame or gas is not discharged upward, it is possible to solve a problem in which passengers including a driver in the electric vehicle are exposed to a risk that may be caused by the flame discharged from the battery module.

Here, a plurality of battery cells 100 may be accommodated in the internal space R of the housing 200.

In addition, the battery cell 100 may include an electrode assembly and a cell body member surrounding the electrode assembly.

The electrode assembly may substantially include an electrolyte, and the electrolyte may be accommodated in the cell body member and used together with the electrode assembly. As an example, the electrolyte may include a lithium salt, such as $LiPF_F$ or $LiBF_4$, in an organic solvent, such as ethylene carbonate (EC), propylene carbonate (PC), diethyl carbonate (DEC), ethyl methyl carbonate (EMC), or dimethyl carbonate (DMC). Furthermore, in an embodiment, the electrolyte may be in a liquid, solid or gel phase.

In addition, the cell body member is a component protecting the electrode assembly while accommodating the electrolyte therein. As an example, the cell body member may be provided as a pouch-type member or a can-type member. Here, the pouch-type member, which accommodates the electrode assembly therein while sealing the electrode assembly on three sides thereof, may be a component configured to seal the electrode assembly by overlapping and bonding the pouch-type member on three sides of the electrode assembly, usually an upper side and both lateral sides except one side that is a lower side, in a state where the electrode assembly is accommodated in the pouch-type member. Also, the can-type member, which accommodates the electrode assembly therein while sealing the electrode assembly on one side thereof, may be a component configured to seal the electrode assembly by overlapping and bonding the can-type member on one side of the electrode assembly, usually an upper surface except three sides that are a lower side and both lateral sides, in a state where the electrode assembly is accommodated in the can-type member.

However, the pouch-type battery cell 100 or the can-type battery cell 100 is merely an example of the battery cell 100 accommodated in the battery module according to the present disclosure, and the battery cell 100 accommodated in the battery module according to the present disclosure is not limited to the above-described type. Four-side sealing type secondary batteries or the like may be accommodated in the battery module according to the present disclosure.

The housing may serve as a body of the battery module in which the plurality of battery cells 100 are accommodated.

That is, the housing, which is a component in which the plurality of battery cells are installed, may serve to not only protect the battery cells but also transfer electrical energy generated from the battery cells externally or transfer electrical energy from the outside to the battery cells.

To this end, the housing may include a bottom member 200a, sidewall members 200b, a cover member 200c, and front and rear members 200e that form the internal space R for accommodating the plurality of battery cells 100. The plate member 210 extending the flame or gas path F may be provided for the bottom member 200a, the sidewall members 200b, the cover member 200c, the front and rear members 200e, or the like.

Here, the front and rear members 200e may include: a front member 200f provided at the front of the housing and connected to one-side electrode lead portions 110 of the battery cells 100; and a rear member 200g provided at the rear of the housing and connected to the other-side electrode lead portions 110 of the battery cells 100, and bus bar members 200h coupled to the electrode lead portions 110 may be provided therebetween.

Accordingly, it is possible to reduce a rate at which a flame caused by an explosion generated from the battery cell 100 accommodated in the internal space R of the housing is discharged externally through the bottom member 200a, the sidewall members 200b, the cover member 200c, the front and rear members 200e, or the like. The reduction in the rate at which the flame is discharged externally of the housing may solve the problem in which the flame propagates to another neighboring battery module, which results in a successive explosion.

In addition, when the plate member 210 is provided for the bottom member 200a, the sidewall members 200b, the cover member 200c, or the front and rear members 200e, the discharge portion 214, through which the flame or gas is discharged, may be formed only sidewardly or downwardly of the housing, thereby preventing the flame or gas from being discharged upward.

In addition, the plate member 210 may include a core portion 213. The core portion 213 may be disposed in a hollow portion H inside the plate member 210, which is a space between the first plate portion 211 and the second plate portion 212, and formed in a structure to extend a path of a flame entering the hollow portion H.

To this end, the plate member 210 of the battery module according to an embodiment of the present disclosure may include: a first plate portion 211 disposed on one side thereof; and a second plate portion 212 spaced apart from the first plate portion 211 by a predetermined interval to form the hollow portion H in which a core portion 213 is provided between the first plate portion 211 and the second plate portion 212.

That is, the bottom member 200a, the sidewall members 200b, the cover member 200c, or the front and rear members 200e may be formed of the plate member 210 itself, and the plate member 210 may include the first plate portion 211, the second plate portion 212, and the core portion 213.

As an example, when the sidewall member 200b is formed of the plate member 210, the first plate portion 211 may be disposed on one side thereof that is exposed externally, and the second plate portion 212 may be disposed inward of the first plate portion 211 to be closer to the battery cells 100 than the first plate portion 211. That is, both end portions of the second plate portion 212 may be at least partially coupled to the first plate portion 211, and a middle portion of the second plate portion 212 may be disposed to be spaced apart from the first plate portion 211 at a predetermined distance while being disposed to be closer to the battery cells 100 than the first plate portion 211.

In addition, the core portion 213 may be disposed in the hollow portion H formed between the first plate portion 211 and the second plate portion 212 disposed to be spaced apart from each other at the predetermined interval. In addition, the core portion 213 may be formed in a structure to extend a path of a flame entering the hollow portion H.

That is, the core portion 213 of the battery module according to an embodiment of the present disclosure may be formed in a pattern in which a unit column portion 213a is repeated. The unit column portion 213a may have a polygonal shell and hollow space surrounded by the shell. For example, the core 213 portion may have honeycomb structure. The core portion 213 includes a plurality of hollow polygonal columns neighboring each other.

In this manner, the core portion 213 may be configured to extend the flame or gas path F through a plurality of unit column portions 213a, because the flame moves while passing through the unit column portions 213a.

As an example, the core portion 213 may be configured to extend the flame or gas path by forming communication portions 213b in the unit column portion 213a. This will be described in detail later with reference to FIG. 8.

Further, the second plate portion 212 may have an entrance portion 215 formed to allow the flame to enter the hollow portion H, and the first plate portion 211 may have a discharge portion 214 formed to discharge the flame, gas, or the like entering the hollow portion H.

In addition, since the core portion 213 is disposed in the hollow portion H between the first plate portion 211 and the second plate portion 212, the core portion 213 may also serve to support the first plate portion 211 and the second plate portion 212. Accordingly, the plate member 210 may secure structural rigidity in shock and vibration environments while making it possible to achieve weight reduction.

Further, the second plate portion 212 of the battery module according to an embodiment of the present disclosure may have an entrance portion 215 formed to allow the internal space R in which the battery cells 100 are accommodated to communicate with the space between the first plate portion 211 and the second plate portion 212.

Accordingly, the flame generated from the battery cell 100 accommodated in the internal space R may enter the hollow portion H of the plate member 210. Thus, the flow path of the flame, gas, or the like may be extended through the core portion 213 disposed in the hollow portion H.

The entrance portion 215 may be further provided with an opening/closing plate portion 216 opening or closing the entrance portion 215. This will be described in detail later with reference to FIG. 9.

In addition, the first plate portion 211 may have a discharge portion 214 formed to discharge the flame or gas entering the hollow portion H externally of the hollow portion H.

Accordingly, if some of the flame entering the hollow portion H, gas, or the like is not dissipated, the flame, gas, or the like may be discharged through the discharge portion 214.

Also, when the first plate portion 211 is disposed to contact the outside, if the battery cell 100 accommodated in the internal space R of the housing 200 explodes, then the internal space R is in a high-pressure environment, as compared with a relatively low-pressure environment outside. Accordingly, high-pressure gas or the like inside the internal space R may be induced to move externally, which is in the low-pressure environment, through the plate member 210. Therefore, the flame generated from the internal space R may also be induced to pass through the plate member 210.

In addition, by forming the discharge portion 214 sidewardly or downwardly of the housing 200, the flame or gas is not discharged upward, thereby solving a problem in which passengers including a driver in the electric vehicle are exposed to a risk that may caused by a flame discharged from the battery module.

Further, the housing 200 of the battery module according to an embodiment of the present disclosure may include: a bottom member 200a on which the plurality of battery cells 100 are seated; front and rear members 200e provided at edges of the bottom member 200a and connected to electrode lead portions 110 of the battery cells 100; sidewall members 200b provided at edges of the bottom member 200a and neighboring the front and rear members 200e; and a cover member 200c provided on upper ends of the front and rear members 200e and the sidewall members 200b. The plate member 210 may at least be provided for the sidewall members 200b.

The bottom member 200a, on which the plurality of battery cells 100 are seated, may serve to support the plurality of battery cells 100 seated thereon.

Here, the bottom member 200a may be configured to transfer heat generated from the battery cells 100 to an external heat sink to cool the battery module.

Also, the sidewall member 200b forming a side portion of the housing may discharge heat generated from the battery cells 100 externally.

The housing may be configured to protect upper ends of the battery cells by including the cover member 200c provided on the upper ends of the sidewall members 200b. In addition, the housing may include front and rear members 200e including a front member 200f and a rear member 200g neighboring the sidewall members 200b. Thus, the housing may be configured to surround the plurality of battery cells 100.

Additionally, the front and rear members 200e may be provided with supplemental components such as bus bar members 200h electrically connecting the battery cells externally.

Also, compression members may be provided on inner side surfaces of the sidewall members 200b to further securely protect the battery cells 100.

In addition, at least one of the bottom member 200a, the sidewall members 200b, the cover member 200c, and the front and rear members 200e may be provided as the plate member 210 extending the flame or gas path F to induce dissipation of the flame. Accordingly, it is possible to solve a problem in which a flame generated from any one battery module spreads to another neighboring battery module, causing a successive explosion.

As an example, the plate member 210 may be provided for the sidewall members 200b, and accordingly, the flame or gas path F may be extended onto the sidewall members 200b to dissipate the flame.

In addition, the plate member 210 may be provided for the front and rear members 200e. This will be described in detail later with reference to FIG. 6.

In addition, the plate member 210 may be provided for the bottom member 200a. This will be described in detail later with reference to FIG. 7.

Meanwhile, the plate member 210 may also be provided for the cover member 200c. In this case, however, the discharge portion 214 may be formed only in a side end portion of the cover member 200c such that the discharge portion 214 is directed only sideward of the housing.

Figure 5:
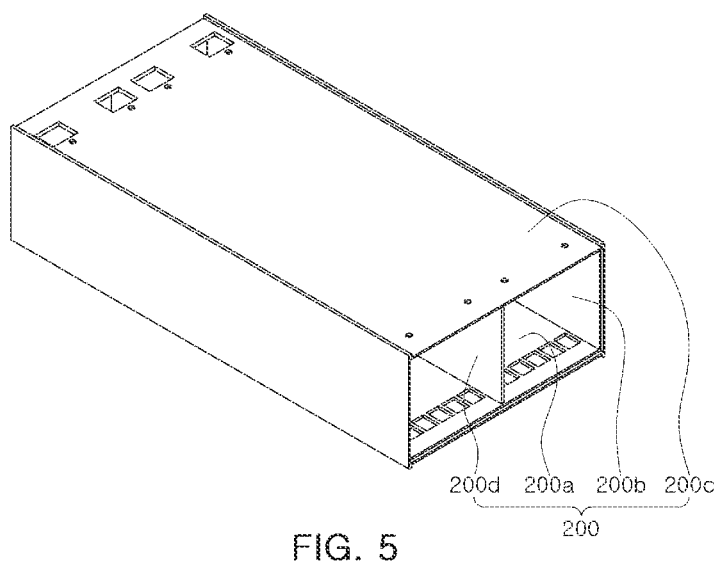
FIG. 5 is a perspective view illustrating an embodiment in which the housing includes a partition member in the battery module according to the present disclosure.

FIG. 5 is a perspective view illustrating an embodiment in which the housing 200 includes a partition member 200d in the battery module according to the present disclosure. Referring to FIG. 5, the housing 200 of the battery module according to an embodiment of the present disclosure may include a partition member 200d disposed in the internal space R to divide the internal space R, and the plate member 210 may also be provided for the partition member 200d.

That is, the partition member 200d may be provided so that an explosion of a battery cell 100 occurring on one side of the internal space R of the housing 200 does not spread to the other side of the internal space R of the housing 200.

As an example, the partition member 200d may be provided at a center portion of the internal space R to divide the internal space R into two spaces.

Accordingly, it is possible to solve a problem in which an explosion of a battery cell 100 accommodated in one side of the internal space R spreads to another battery cell 100 accommodated in the other side of the internal space R.

Figure 6:
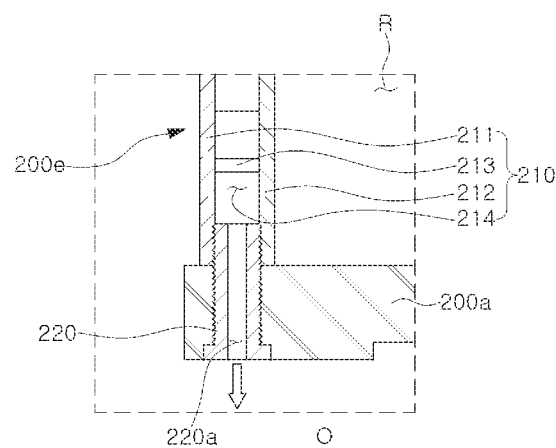
FIG. 6 is a front cross-sectional view illustrating a plate member provided for front and rear members in the battery module according to the present disclosure.

FIG. 6 is a front cross-sectional view illustrating a plate member 210 provided for the front and rear members 200e in the battery module according to the present disclosure. The housing 200 of the battery module according to an embodiment of the present disclosure may include: a bottom member 200a on which the plurality of battery cells 100 are seated; and front and rear members 200e provided at edges of the bottom member 200a and connected to electrode lead portions 110 of the battery cells 100. The plate member 210 may at least be provided for the front and rear members 200e.

Here, the front and rear members 200e may be connected to the electrode lead portions 110 that are connected to electrodes of the electrode assemblies of the battery cells 100.

In addition, the plate member 210 may be provided for the front and rear members 200e, and accordingly, the flame or gas path F may be extended onto the front and rear members 200e to dissipate the flame.

In the front and rear members 200e, the discharge portion 214, through which the flame or gas is discharged from the inside of the plate member 210, may be formed in a relatively low-level sealed portion to which a high voltage (HV) terminal or a bolt is coupled, the HV terminal connecting the electrode lead portions 110 to an external device such as an engine of the electric vehicle. However, the discharge portion 214 according to the present disclosure is not limited thereto as long as the flame or gas is discharged sidewardly or downwardly of the housing 200 from the hollow portion H of the plate member 210 externally.

In addition, each of the front and rear members 200e of the battery module according to an embodiment of the present disclosure may include a bolt member 220 screw-coupled to a lower end portion of the plate member 210 to couple the plate member 210 to the bottom member 200a.

That is, the bolt member 220 may penetrate through the bottom member 200a and be screw-coupled to the lower end portion of the plate member 210 provided for the front and rear members 200e, such that the plate member 210 provided for the front and rear members 200e is fixed to the bolt member 220.

Here, the bolt member 220 of the battery module according to an embodiment of the present disclosure may have a bolt hole 220a formed in a length direction to communicate with the space between the first plate portion 211 and the second plate portion 212.

The bolt hole 220a may communicate with the discharge portion 214 of the plate member 210 formed downward of the housing. Accordingly, the plate member 210 may discharge the flame or gas that is not dissipated externally from the hollow portion H of the plate member 210, which is the space between the first plate portion 211 and the second plate portion 212, via the bolt hole 220a.

Figure 7:
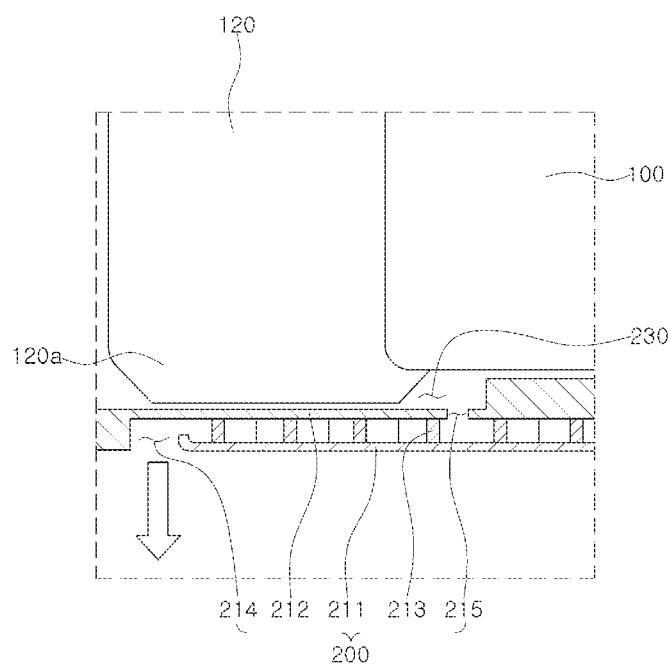
FIG. 7 is a front cross-sectional view illustrating a plate member provided for the bottom member in the battery module according to the present disclosure.

FIG. 7 is a front cross-sectional view illustrating a plate member 210 provided for the bottom member 200a in the battery module according to the present disclosure. Referring to FIG. 7, the housing 200 of the battery module according to an embodiment of the present disclosure may include: a bottom member 200a on which the plurality of battery cells 100 are seated; and front and rear members 200e provided at edges of the bottom member 200a and connected to electrode lead portions 110 of the battery cells 100. The plate member 210 may at least be provided for the bottom member 200a.

That is, the plate member 210 may be provided for the bottom member 200a, and accordingly, the flame or gas path F may be extended onto the bottom member 200a to dissipate the flame.

Here, the discharge portion 214 for discharging the flame or gas externally from the hollow portion H of the plate member 210 may be formed in a lower surface of the bottom member 200a so that the flame or gas is discharged downward of the housing 200, or formed in a side end portion of the bottom member 200a so that the flame or gas is discharged sideward of the housing 200.

In addition, the entrance portion 215 of the plate member 210 allowing the hollow portion H to communicate with the internal space R in which the battery cells 100 are accommodated may be formed in a recess 230 of the bottom member 200a into which the flame or gas generated from the battery cell 100 may be relatively easily converged.

That is, the bottom member 200a of the battery module according to an embodiment of the present disclosure may include a recess 230 formed to be recessed so that a shark fin portion 120a protruding downward from a sealing portion 120 of the battery cell 100 is located therein. In the recess 230, the entrance portion 215 may be formed to allow the internal space R in which the battery cells 100 are accommodated to communicate with the space between the first plate portion 211 and the second plate portion 212.

Here, the sealing portion 120 is a portion formed at an end portion of the cell body member to seal the electrode assembly when the electrode assembly is accommodated in the cell body member of the battery cell 100.

In addition, the shark fin portion 120a, which is apart of the sealing portion 120, is a portion further extending in a direction toward the bottom member 200a.

Figure 8:
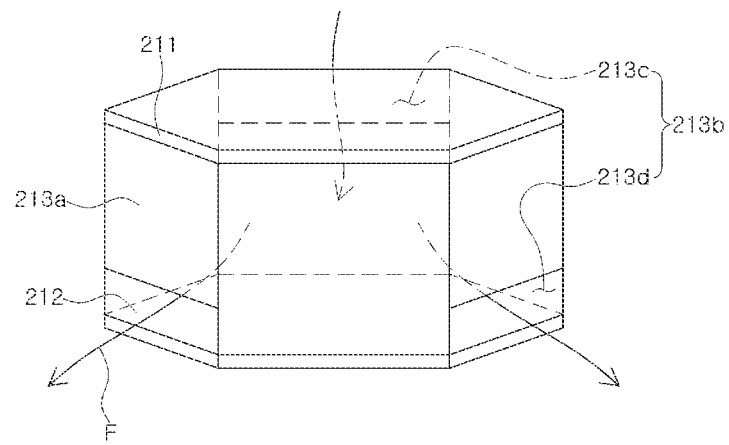
FIG. 8 is a perspective view illustrating a unit column portion of a core portion in the battery module according to the present disclosure.

FIG. 8 is a perspective view illustrating the unit column portion 213a of the core portion 213 in the battery module according to the present disclosure. Referring to FIG. 8, the unit column portion 213a of the battery module according to an embodiment of the present disclosure may have communication portions 213b formed in at least two column surfaces thereof.

Accordingly, a flame, gas, or the like introduced into the unit column portion 213a of the core portion 213 may spread to another neighboring unit column portion 213a. As a result, it is possible to extend a flow path of the flame, gas, or the like entering the core portion 213.

In addition, the unit column portion 213a of the battery module according to an embodiment of the present disclosure may have a first communication portion 213c formed adjacent to the first plate portion 211 and a second communication portion 213d formed adjacent to the second plate portion 212 to form the flame or gas path in a zigzag form.

When the communication portions 213b are formed in such a form, the flow path of the flame, gas, or the like may further be extended, and an indirect cooling effect may also be caused. Accordingly, it is possible to increase the flame dissipation effect and form the gas at a relatively low temperature.

As an example, the flame, gas, or the like may enter the unit column portion 213a through the first communication portion 213c, and the flame, gas, or the like may be discharged to another neighboring unit column portion 213a through the second communication portion 213d, thereby extending the flow path of the flame, gas, or the like.

In addition, if the first communication portion 213c is a hole formed adjacent to the first plate portion 211, and the second communication portion 213d is a hole formed adjacent to the second plate portion 212, the flame, gas, or the like may penetrate through the unit column portions 213a on a plane horizontal to the first plate portion 211 or the second plate portion 212, in a state where the flow path is secured in directions intersecting with the plane, thereby further extending the flow path of the flame, gas, or the like in a zigzag form.

In addition, when the first plate portion 211 or the second plate portion 212 is disposed adjacent externally, which is in a relatively low temperature environment, the flame, gas, or the like may be cooled while passing through the first communication portion 213c or the second communication portion 213d.

Figure 9:
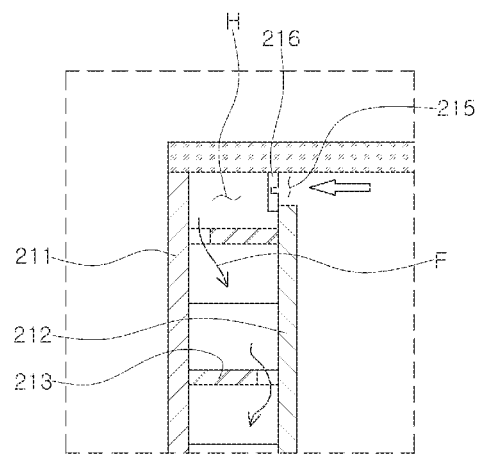
FIG. 9 is a side cross-sectional view illustrating an embodiment in which an opening/closing plate portion of the plate member is formed to be damaged by heat or pressure that is caused by an explosion of a battery cell in the battery module according to the present disclosure.
Figure 10:
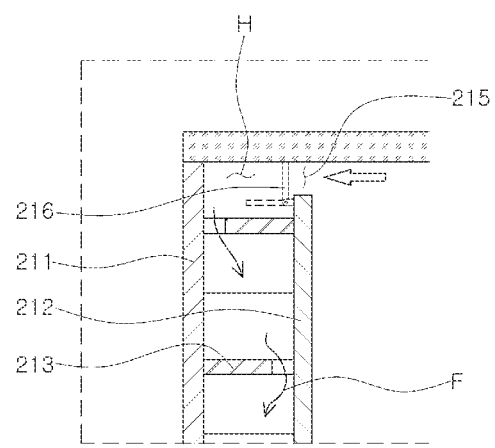
FIG. 10 is a side cross-sectional view illustrating an embodiment in which an opening/closing plate portion of the plate member is formed to be rotated by pressure that is caused by an explosion of a battery cell in the battery module according to the present disclosure.

FIG. 9 is a side cross-sectional view illustrating an embodiment in which an opening/closing plate portion 216 of the plate member 210 is formed to be damaged by heat or pressure that is caused by an explosion of a battery cell 100 in the battery module according to the present disclosure, and FIG. 10 is a side cross-sectional view illustrating an embodiment in which an opening/closing plate portion 216 of the plate member 210 is formed to be rotated by pressure that is caused by an explosion of a battery cell 100 in the battery module according to the present disclosure.

Referring to FIGS. 9 and 10, the plate member 210 of the battery module according to an embodiment of the present disclosure may include an opening/closing plate portion 216 connected to the second plate portion 212 and opening or closing the entrance portion 215.

By means of the opening/closing plate portion 216 as described above, it is possible to prevent a problem in which external foreign substances flowing backward enter the internal space R through the plate member 210.

In addition, in order to induce a flame, gas, or the like, which is generated when a battery cell 100 accommodated in the internal space R explodes, to the plate member 210, the opening/closing plate portion 216 needs to open the entrance portion 215 when the battery cell 100 explodes.

To this end, the opening/closing plate portion 216 of the battery module according to an embodiment of the present disclosure may be formed to be damaged by heat or pressure that is caused by an explosion of any one of the battery cells 100.

In other words, the opening/closing plate portion 216 may be formed to be melted and damaged by the heat that is caused by the explosion of the battery cell 100 to open the entrance portion 215, or configured to be cracked and damaged by high-pressure gas that is caused by the explosion of the battery cell 100 to open the entrance portion 215.

As an example, as illustrated in FIG. 9, the opening/closing plate portion 216 may have a groove formed in a portion thereof, such that the groove portion is formed to be more vulnerable to high-pressure gas than the other portion.

Alternatively, the opening/closing plate portion 216 may be provided in a form of a door that is opened or closed as illustrated in FIG. 10 as an example.

That is, one end of the opening/closing plate portion 216 of the battery module according to an embodiment of the present disclosure may be hinge-coupled to the second plate portion 212 so that the opening/closing plate portion 216 is rotated in a direction toward the hollow portion H by pressure that is caused by an explosion of any one of the battery cells 100 to open the entrance portion 215.

In this manner, the opening/closing plate portion 216 may be configured to be damaged by the heat or pressure that is caused by the explosion of the battery cell 100 to open the entrance portion 215, but may also be configured in the form of the door to open the entrance portion 215.

To this end, one end of the opening/closing plate portion 216 may be hinge-coupled to the second plate portion 212 to rotate the opening/closing plate portion 216, and an elastic member imparting a predetermined elastic force in a direction to close the entrance portion 215 may be connected to one end of the opening/closing plate portion 216.

Accordingly, when the battery cell 100 accommodated in the internal space R explodes and thereby the internal space R is in a high-pressure environment, the opening/closing plate portion 216 may be rotated in a direction to open the entrance portion 215.

Figure 11:
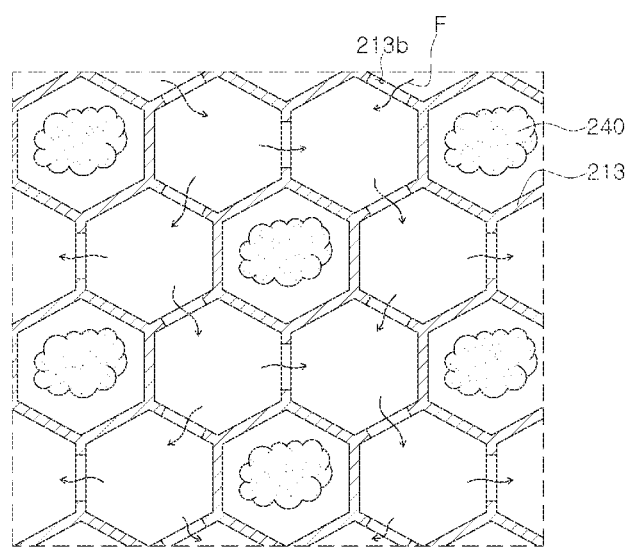
FIG. 11 is a front cross-sectional view illustrating an embodiment in which the plate member is provided with an accommodation member in the battery module according to the present disclosure.

FIG. 11 is a front cross-sectional view illustrating an embodiment in which the plate member 210 is provided with an accommodation member 240 in the battery module according to the present disclosure. Referring to FIG. 11, the plate member 210 of the battery module according to an embodiment of the present disclosure may include an accommodation member 240 accommodated in the space between the first plate portion 211 and the second plate portion 212, and formed of a material for performing at least one of an extinguishing function, a heat absorption function, and a fire resistance function.

Accordingly, when the first plate portion 211 or the second plate portion 212 disposed adjacent to the internal space R is melted by the heat or flame, the accommodation member 240 may serve at least one of the extinguishing function, the heat absorption function, and the fire resistance function while directly contacting the heat and flame.

As set forth above, according to various embodiments of the present disclosure, the battery module according to the present disclosure is advantageous in that it is possible to solve a problem in which an explosion of any one battery module causes a successive explosion to another adjacent battery module.

That is, the battery module according to the present disclosure is effective in preventing thermal runaway of any one battery module from leading to thermal propagation to another battery module.

Further, the battery module according to the present disclosure is advantageous in that it is possible to dissipate a flame generated by an explosion of any one battery module.

In addition, the battery module according to the present disclosure is advantageous in that it is possible to solve a problem in which passengers including a driver in an electric vehicle are exposed to a risk that may caused by a flame discharged from the battery module.

While various embodiments have been shown and described above, it will be apparent to those skilled in the art that modifications and variations could be made without departing from the scope of the present invention as defined by the appended claims.

What is claimed is:

1. A battery module comprising:
a plurality of battery cells; and
a housing having an internal space in which the plurality of battery cells are accommodated,
wherein the housing is at least partially formed of a plate member which is connected with the internal space,
wherein the plate member forms a flame or gas path which in an event of a battery cell malfunction generating a flame of gas is configured to discharge the generated flame or gas externally of the housing,
wherein the plate member includes:
a first plate portion;
a second plate portion positioned opposite to and spaced apart from the first plate portion, wherein the first and second plate portions form the flame path;
a core portion disposed between the first plate portion and the second plate portion and configured to extend the flame or gas path; and
a discharge portion formed sidewardly or downwardly of the housing in the first plate portion or the second plate portion to discharge the flame or gas entering between the first plate portion and the second plate portion externally,
wherein the core portion includes a plurality of hollow polygonal columns neighboring each other.

2. The battery module of claim 1, wherein the plate member is integrally formed with a bottom member or a sidewall member of the housing and includes an entrance portion in communication with the internal space and a discharge portion configured to discharge the flame or gas.

3. The battery module of claim 1, wherein the housing includes:

a bottom member on which the plurality of the battery cells are seated; and
front and rear members provided at edges of the bottom member and connected to electrode lead portions of the plurality of the battery cells, and
the plate member is provided at least for the front and rear members.

4. The battery module of claim 3, wherein each of the front and rear members includes a bolt member screw-coupled to a lower end portion of the plate member to couple the plate member to the bottom member.

5. The battery module of claim 4, wherein the bolt member has a bolt hole formed in a length direction to communicate with a space of the flame or gas path formed between the first plate portion and the second plate portion.

6. The battery module of claim 1, wherein the housing includes:

a bottom member on which the plurality of the battery cells are seated; and
front and rear members provided at edges of the bottom member and connected to electrode lead portions of the plurality of the battery cells, and
the plate member is provided at least for the bottom member.

7. The battery module of claim 6, wherein the bottom member includes a recess formed to receive a shark fin portion protruding downward from a sealing portion of each of the battery cells, and
an entrance portion formed in the recess to allow the communication between the internal space and the flame or gas path.

8. The battery module of claim 1, wherein the housing includes:

a bottom member on which the plurality of the battery cells are seated;
front and rear members provided at edges of the bottom member and connected to electrode lead portions of the plurality of the battery cells;
sidewall members provided at edges of the bottom member and neighboring the front and rear members; and
a cover member provided on upper ends of the front and rear members and the sidewall members, and
the plate member is provided at least for the sidewall members.

9. The battery module of claim 8, wherein the unit column portion has communication portions formed in at least two column surfaces thereof.

10. The battery module of claim 8, wherein the unit column portion has a first communication portion formed adjacent to the first plate portion and a second communication portion formed adjacent to the second plate portion to form the flame or gas path in a zigzag form.

11. The battery module of claim 1, wherein the second plate portion has an entrance portion formed to allow the internal space in which the battery cells are accommodated to communicate with a space between the first plate portion and the second plate portion.

12. The battery module of claim 1, wherein the plate member includes an opening/closing plate portion connected to the second plate portion and opening or closing the entrance portion.

13. The battery module of claim 1, wherein the plate member includes an accommodation member accommodated in a space between the first plate portion and the second plate portion and formed of a material for performing at least one of an extinguishing function, a heat absorption function, and a fire resistance function.

14. A battery module comprising:

a housing forming an internal space configured to accommodate a plurality of battery cells, the housing including a plate member;

wherein the plate member includes an entrance portion in communication with the internal space, a discharge portion, and a flame or gas path connecting the entrance portion with the discharge portion, wherein the olate member forms a flame or gas path which in an event of a battery cell malfunction generating a flame of gas is configured to discharge the generated flame or gas externally of the housing, wherein the plate member includes:
- a first plate portion;
- a second olate portion positioned opposite to and spaced apart from the first plate portion, wherein the first and second plate portions form the flame path;
- a core portion disposed between the first plate portion and the second olate portion and configured to extend the flame or gas path; and
- a discharge portion formed sidewardly or downwardly of the housing in the first plate portion or the second plate portion to discharge the flame or gas entering between the first plate portion and the second plate portion externally, wherein the core portion includes a plurality of hollow polygonal columns neighboring each other.

15. The battery module of claim 2, wherein the plate member is integrally formed with a bottom member of the housing and is configured to discharge the flame or gas downwardly of the battery module.

16. The battery module of claim 15, wherein the bottom member of the battery module includes a recess formed to receive shark fin portions protruding downward from sealing portions of the plurality of the battery cells, and wherein the recess includes the entrance portion.

* * * * *